(12) United States Patent
Fulkerson et al.

(10) Patent No.: US 6,490,087 B1
(45) Date of Patent: Dec. 3, 2002

(54) OPTICAL SYSTEMS FOR REFLECTIVE LCD'S

(75) Inventors: E. Gregory Fulkerson, Amelia, OH (US); Simon Magarill, Cincinnati, OH (US); John D. Rudolph, Cincinnati, OH (US)

(73) Assignee: U.S. Precision Lens Incorporated, Cincinnati, OH (US)

(*) Notice: Subject to any disclaimer, the term of this patent is extended or adjusted under 35 U.S.C. 154(b) by 0 days.

(21) Appl. No.: 09/546,241

(22) Filed: Apr. 10, 2000

Related U.S. Application Data (60) Provisional application No. 60/130,419, filed on Apr. 21, 1999, provisional application No. 60/132,928, filed on May 6, 1999, provisional application No. 60/166,468, filed on Nov. 19, 1999, and provisional application No. 60/179,227, filed on Jan. 31, 2000.

(51) Int. Cl.⁷ ............................ G02B 5/30; G02F 1/1335
(52) U.S. Cl. .................. 359/487; 359/485; 359/494; 359/497; 359/900; 349/5; 349/8; 349/9; 353/20; 353/30; 353/31
(58) Field of Search ................................ 359/483, 485, 359/487, 494, 497, 900; 353/20, 31, 34, 30; 349/5, 8, 9

(56) References Cited

U.S. PATENT DOCUMENTS

| | | |
|---|---|---|
| 5,115,305 A | 5/1992 | Baur et al. |
| 5,198,928 A | 3/1993 | Chauvin et al. |
| 5,327,270 A | 7/1994 | Miyatake |
| 5,921,650 A * | 7/1999 | Doany et al. ............... 353/20 |
| 5,975,703 A * | 11/1999 | Holman et al. ............. 349/9 |
| 6,113,239 A * | 9/2000 | Sampsell et al. ........... 349/9 |
| 6,183,091 B1 * | 2/2001 | Johnson et al. ............ 353/20 |
| 6,304,302 B1 * | 10/2001 | Huang et al. ............... 349/9 |
| 6,309,071 B1 * | 10/2001 | Huang et al. ............... 353/20 |

FOREIGN PATENT DOCUMENTS

| | | |
|---|---|---|
| JP | 5-173105 | 7/1993 |
| JP | 7-013121 | 1/1995 |
| JP | 9-297352 | 11/1997 |
| JP | 10-010995 | 1/1998 |
| JP | 10-133147 | 5/1998 |
| JP | 10-253922 | 9/1998 |
| JP | 10-260313 | 9/1998 |
| JP | 11-015399 | 1/1999 |
| JP | 11-326834 | 11/1999 |

OTHER PUBLICATIONS

Bone et al., "Novel Optical System Design for Reflective CMOS Technology," Proceedings of SPIE, vol. 3634, pp. 80–86, 1999.

* cited by examiner

Primary Examiner—Cassandra Spyrou
Assistant Examiner—John Juba, Jr.
(74) Attorney, Agent, or Firm—Maurice M. Klee (57) ABSTRACT

Optical systems for use with reflective LCDs (8,9,32,34,36) are provided. The systems include a polarization beam splitter (5) which can be composed of polarization beam splitting cubes (26) having sheet polarizers (30) and/or half wave plates (28) at their mating surfaces. By orienting the half wave plates (28) so that they convert S polarization to P polarization and P polarization to S polarization, the polarization beam splitter (5) can provide a high contrast ratio at a viewing screen between light from the "on" and "off" pixels of the reflective LCDs (8,9,32,34,36).

18 Claims, 6 Drawing Sheets

PRIOR ART

OPTICAL SYSTEMS FOR REFLECTIVE LCD'S

CROSS REFERENCE TO RELATED PROVISIONAL APPLICATION

This application claims the benefit under 35 USC §119(e) of U.S. Provisional Application No. 60/130,419, filed Apr. 21, 1999, U.S. Provisional Application No. 60/132,928, filed May 6, 1999, U.S. Provisional Application No. 60/166,468, filed Nov. 19, 1999, and U.S. Provisional Application No. 60/179,227, filed Jan. 31, 2000, the contents of all of which are incorporated herein in their entirety.

FIELD OF THE INVENTION

This invention relates to projection optical devices which employ reflective LCD's.

BACKGROUND OF THE INVENTION

Figure 1:
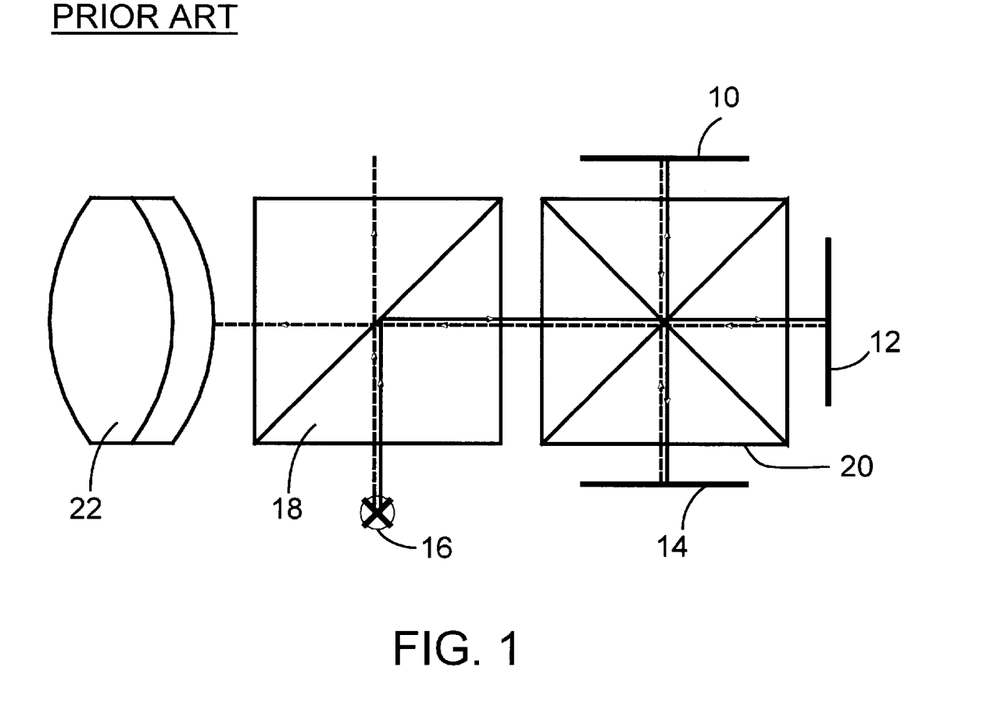
FIG. 1 is a schematic drawing of an on-axis layout of a prior art projection system employing three reflective LCD panels.

FIG. 1 is an on-axis layout of a prior art projection system employing three reflective LCD panels, i.e., LCD 10 for red light, LCD 12 for green light, and LCD 14 for blue light. Light form a source 16 is polarized by a conventional polarization beam splitting cube 18 and the S-component of the light (shown by a continuous line in this and all other figures) is reflected towards color cube 20 and the LCD's. The color cube separates light into the red, green, and blue primary colors.

Light reflected from the "on" pixels of the LCDs has P-polarization (shown by a broken line in this and all other figures) and thus passes through the diagonal of the polarization beam splitting cube (PBS cube) to projection lens 22 to create an image on a screen (not shown). Light reflected from "off" pixels has S-polarization, which reflects from the diagonal of the PBS cube and thus does not pass into the screen space.

Although the design of FIG. 1 has a compact architecture, it suffers from a number of fundamental drawbacks, including: (1) P-polarization from the source is completely lost; (2) the contrast of the system is limited by the polarization properties of the diagonal of the PBS cube, which properties tend to be poor for the f-numbers typically required for commercial projectors; and (3) the color cube needs to work with both S and P polarization for all three colors, which leads to low efficiency of color separation/recombination.

In particular, the slope of a dichroic cut-off filter is always less than 100% so that to avoid undesired color mixing, some light on the borders between blue and green and between green and red must be intentionally cut off and thus lost. Moreover, the amount of light cut off must take account of the fact that the slope and cut-off wavelength of a dichroic filter depend on polarization and angle of incidence. As a result of these effects, substantial light loss can occur when all three LCDs are located in the same polarization channel and a single color cube is used to split and recombine the three primary light colors.

Japanese Patent Publication No. 10-253922 illustrates a variation of the system of FIG. 1 which uses two dichroic prisms instead of a single color cube. Although better than the basic system, the approach of this patent publication is mechanically complex and can exhibit reduced contrast through its reliance on a single polarization beam splitting cube having only one polarizing diagonal.

Another known configuration is that developed by S-VISION Inc. of Santa Clara, Calif. See Bone et al., "Novel Optical System Design for Reflective CMOS Technology," Proceedings of SPIE, Volume 3634, pages 80–86, 1999. This approach uses off-axis optics, two color cubes, and two film polarizers (one as a polarizer and the other as an analyzer) to enhance contrast. Each color cube works with one polarization, which increases the efficiency of color separation/recombination. The problems here include: (1) the cost of two color cubes; (2) loss of the second polarization from the light source; and (3) the complexity and expense of off-axis optics.

SUMMARY OF THE INVENTION

In view of the foregoing, it is an object of the invention to provide improved optical systems for use with reflective LCD's. In particular, it is an object of the invention to provide optical systems which have some and preferably all of the following properties: (1) the system is mechanically simple and compact, (2) the system minimizes the use of expensive optical components, (3) the system uses at least some of the light of each polarization, and (4) the system achieves a high level of contrast.

To achieve these and other objects, the invention in accordance with certain of its aspects provides a unitary polarization beam splitter having first, second, third, and fourth sides and two polarizing diagonals, said diagonals intersecting at right angles, said splitter being symmetric about each diagonal (i.e., the splitter has mirror symmetry about each diagonal), wherein light having S polarization primarily reflects from each diagonal and light having P polarization primarily transmits through each diagonal.

In certain preferred embodiments, the unitary splitter comprises four polarization beam splitting cubes, each cube adjoining two other cubes along two faces to form the overall polarization beam splitter. In some embodiments, the cubes are all of the same size, while in other embodiments, two of the cubes have a first size and two of the cubes have a second size.

Half wave plates and/or sheet polarizers can be located between adjoining faces of the polarization beam splitting cubes. Zero, two or four half wave plates and zero, two, or four sheet polarizers can be used in any combination as desired. The sheet polarizers improve contrast. The half wave plates can be used to compensate for skew ray polarization leakage or can be used to improve contrast in which case each half wave plate is oriented so as to convert S polarized light to P polarized light and P polarized light to S polarized light.

In accordance with others of its aspects, the invention provides an optical system which comprises a polarization beam splitter of the type described above, a light source for providing light to a portion of the first side of the splitter, a projection lens for receiving light passing out of a portion of the second side of the splitter, said second side being opposite to the first side, and at least a first reflective, polarization converting, pixelized panel and a second reflective, polarization converting, pixelized panel, each panel serving to modulate light passing from the light source to the projection lens. In certain preferred embodiments, one or both of the pixelized panels are associated with sides of the splitter different from the sides of the splitter with which the light source and the projection lens are associated.

In accordance with further of its aspects, the invention provides a method for improving the contrast of a projection system employing at least one reflective, polarization converting, pixelized panel comprising passing light from a light source to the pixelized panel, modulating the light at the pixelized panel, and passing the modulated light to a projection lens, wherein:

(a) between the light source and the projection lens, at least some of the light passes through two half wave plates oriented so as to transform S polarized light to P polarized light and P polarized light to S polarized light;

(b) between the light source and the pixelized panel, the light interacts with two polarization diagonals, the light having S polarization for one of said interactions and having P polarization for the other of said interactions; and (c) between the pixelized panel and the projection lens, the light interacts with two polarization diagonals, the light having S polarization for one of said interactions and having P polarization for the other of said interactions;

where an interaction with a polarization diagonal involves:

(i) primarily transmission through the diagonal if the light has P polarization; and (ii) primarily reflection from the diagonal if the light has S polarization.

In accordance with certain preferred embodiments of these aspects, the invention provides a method for improving the contrast of a projection system employing at least two reflective, polarization converting, pixelized panels comprising passing light from a light source to the two pixelized panels, modulating the light at the two pixelized panels, and passing the modulated light to a projection lens, wherein:

(a) between the light source and the projection lens, a first portion of the light passes through first and second half wave plates and a second portion of the light passes through third and fourth half wave plates, each half wave plate being oriented so as to transform S polarized light to P polarized light and P polarized light to S polarized light;

(b) between the light source and each of the two pixelized panels, the light interacts with two polarization diagonals, the light having S polarization for one of said interactions and having P polarization for the other of said interactions; and (c) between each of the two pixelized panels and the projection lens, the light interacts with two polarization diagonals, the light having S polarization for one of said interactions and having P polarization for the other of said interactions;

where an interaction with a polarization diagonal involves:

(i) primarily transmission through the diagonal if the light has P polarization; and (ii) primarily reflection from the diagonal if the light has S polarization.

In accordance with still further of its aspects, the invention provides an optical system comprising:

(a) a polarization beam splitter for producing two beams of polarized light;

(b) a dichroic prism which receives one of said beams;

(c) an optical path length compensator which receives the other of said beams; and (d) at least one light filter associated with the optical path length compensator.

In certain embodiments, the at least one light filter comprises two light filters on opposite sides of the compensator, one being a short pass filter, i.e., a filter which passes shorter wavelengths, and the other being a long pass filter, i.e., a filter which passes longer wavelengths.

As discussed below in detail, the invention achieves various benefits including cost reduction through the use of lower cost dichroics and/or filters for color separation, brightness enhancement through at least partial and, in some embodiments, complete polarization recovery, and high contrast between "on" and "off" pixels in the light transmitted to the viewing screen.

BRIEF DESCRIPTION OF THE DRAWINGS

FIGS. 3–5 are schematic drawings of an embodiment of the invention which uses a polarization beam splitter composed of polarization beam splitting cubes. FIG. 3 shows the light paths that create the image, FIG. 4 shows the light paths for "leaking" polarization through the "illumination" diagonals of cubes 26A, 26B, and 26C, and FIG. 5 shows the light paths for "leaking" polarization through the "imaging" diagonals of cubes 26B, 26C, and 26D.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The reference numbers used in the drawings correspond to the following:

1 first side of polarization beam splitter
2 second side of polarization beam splitter
3 third side of polarization beam splitter
4 fourth side of polarization beam splitter
5 polarization beam splitter
6 diagonal of polarization beam splitter
7 diagonal of polarization beam splitter
8 reflective LCD
9 reflective LCD
10 red reflective LCD
12 green reflective LCD
14 blue reflective LCD
16 light source
18 conventional polarization beam splitting cube (PBS cube)

20 color cube
22 projection lens
26A polarization beam splitting cube
26B polarization beam splitting cube
26C polarization beam splitting cube
26D polarization beam splitting cube
26S small polarization beam splitting cube
26L large polarization beam splitting cube
28 half wave plate
30 sheet polarizer
32 red reflective LCoS
34 green reflective LCoS
36 blue reflective LCoS
38 color dichroic cube (dichroic prism)
40 compensator
100 output light to projection lens

DESCRIPTION OF THE PREFERRED EMBODIMENTS

As discussed above, the present invention provides optical systems for use with reflective LCDs. As known in the art, the "on" pixels of such devices change S polarization to P polarization and P polarization to S polarization, while the "off" pixels leave the polarization of the incoming light unchanged.

Reflective LCDs of various types now known or subsequently developed can be used in the practice of the invention. More generally, the invention can be used with reflective, polarization converting, pixelized panels of any type, whether or not a liquid crystal material is used to achieve the polarization change. For ease of description, the LCD nomenclature is employed throughout this specification, it being understood that the use of this nomenclature is not intended to limit the scope of the invention in any way.

The optical systems of the invention can be implemented with two or three reflective LCDs. The polarization of the incoming light for the LCDs can be the same (see, for example, FIG. 9) or different (see, for example, FIGS. 2, 3, and 6).

In the case of a two LCD system, a color wheel is used to produce a full color image. As is well known, image quality is mainly based on green light, with the conventional ratio between the intensities of the primary colors being R:G:B=30:60:10. Accordingly, one approach for a two LCD system is to use one of the LCDs for a green channel and the other LCD in combination with a color wheel for a red/blue channel. This approach results in a loss of light of only about 20%, i.e., 0.5·(30+10)=20%. To maintain the desired color temperature of white light on the screen, the red/blue color wheel can include a green filter to capture some green color from this channel. Alternatively, a color wheel can be located between the light source and the polarization beam splitter with both LCD panels operating in full color.

Instead of a color wheel, three reflective LCDs can be used, along with one or more dichroic prisms and/or dichroic mirrors and/or color filters to produce the red, green, and blue channels. In such a case, one of the beams produced by the polarization beam splitter will be used for the green channel and the other beam will be split between the red and blue channels. When a dichroic prism is used to separate the red and blue channels, an optical path length compensator is preferably included in the green channel (see, for example, FIG. 10).

With the foregoing general description as background, the invention will now be more fully described by the following non-limiting examples.

EXAMPLE 1

Figure 2:
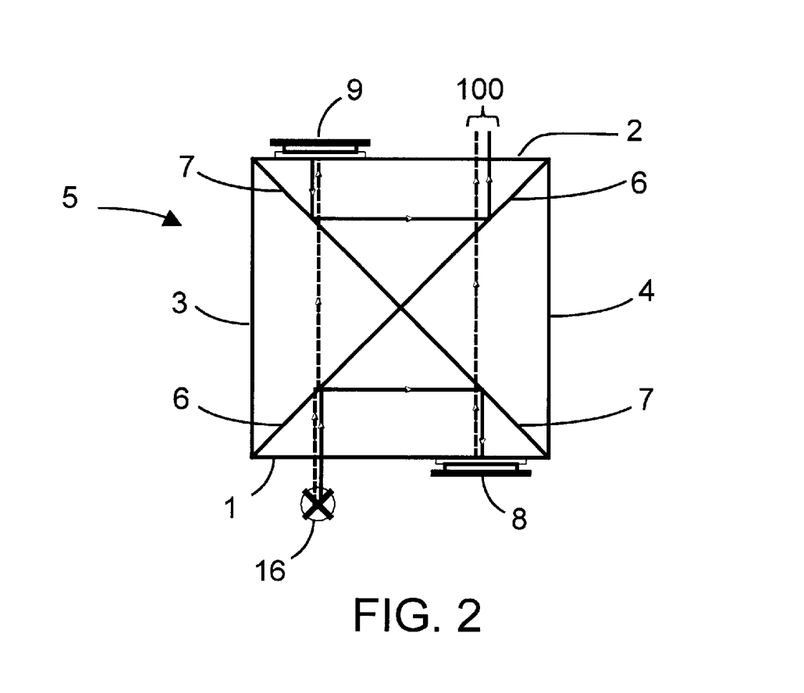
FIG. 2 is a schematic drawing of an embodiment of the invention which employs a dual channel polarization beam splitter capable of providing full polarization recovery.

A first exemplary embodiment of the invention is shown in FIG. 2. This embodiment employs: (1) polarization beam splitter 5 having sides 1, 2, 3, and 4 and diagonals 6 and 7; (2) light source (illuminator) 16; and (3) reflective LCDs 8 and 9. As shown in FIG. 2, light having S-polarization (continuous line) is reflected at each diagonal, while light having P-polarization (broken line) is transmitted through each diagonal. In this way, complete usage of the light emitted from the illuminator is achieved, i.e., full polarization recovery is achieved.

In particular, light having random polarization from light source 16 is separated into S-polarized and P-polarized light at diagonal 6 of polarization beam splitter 5. The S-polarization is reflected from diagonal 6 and after a second reflection from diagonal 7 illuminates LCD 8. Light reflected from "on" pixels of LCD 8 changes polarization to become P-polarized light which passes through diagonals 7 and 6 and enters the projection lens (not shown in FIG. 2). Light reflected from "off" pixels does not change polarization and thus is reflected back into the illuminator 16 by diagonals 7 and 6.

P-polarization from the light source passes through diagonals 6 and 7 and illuminates LCD 9. After reflection from the "on" pixels of this LCD, the P-polarized light changes its polarization to become S-polarized light. This light reflects from diagonal 7 and after a second reflection from diagonal 6 enters the projection lens. Light reflected from "off" pixels of LCD 9 does not change polarization and is reflected back into the illuminator.

To create a color image on the screen, the system can use a color wheel on illumination side 1 of polarization beam splitter 5. Alternatively, the system can use three reflective LCDs, e.g., a green LCD on side 2 of the beam splitter and red and blue LCDs on side 1 of the beam splitter, with the red and blue S-polarized light being separated using a color dichroic cube (dichroic prism) of the type illustrated in FIG. 10 and discussed below.

In practice, the LCDs can be cemented to polarization beam splitter 5. Also, field lenses can be used in front of each LCD to decrease the size of the polarization beam splitter. Again, if desired, these field lenses can be cemented to the polarization beam splitter.

Advantages of the configuration of FIG. 2 include: (1) both polarizations of the light from the illuminator are used which increases the brightness on the screen; (2) the system is compact; and (3) the system significantly increases the polarization efficacy of the polarization beam splitter and provides high contrast on the screen since light passing from the illuminator to the LCDs interacts with the polarization beam splitter's diagonals twice and light passing between the LCDs and the projection lens also interacts with the diagonals twice.

This last advantage can be illustrated by the following numerical example. If one assumes that 2% of "wrong" polarization from "off" pixels of a LCD will leak through a diagonal, then by interacting the wrongly polarized light with a second diagonal the net effect will be to reduce the amount of wrong polarization reaching the screen to 0.04%, i.e., 0.02·0.02=0.0004 (or 0.04%). Accordingly, the system of FIG. 2 can reduce the need for additional polarizers to enhance contrast.

EXAMPLE 2

Figure 3:
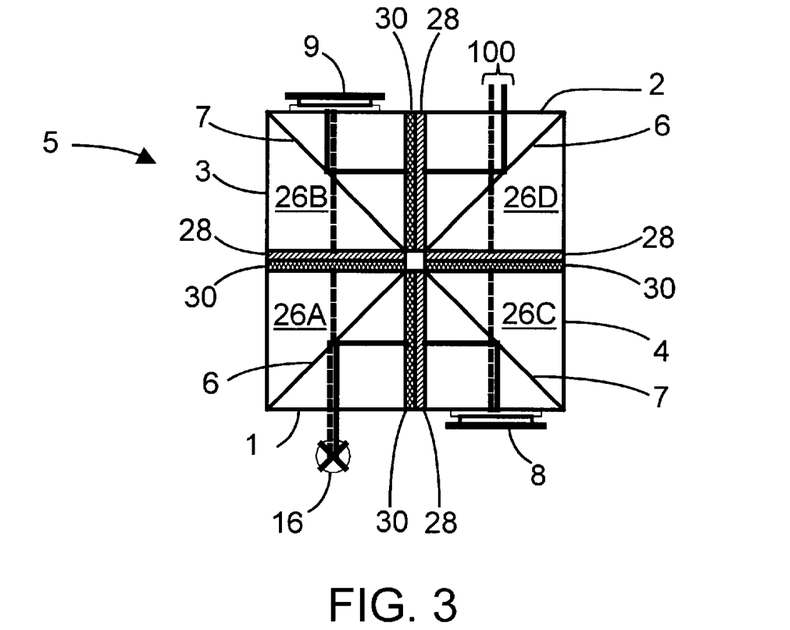
Figure 4:
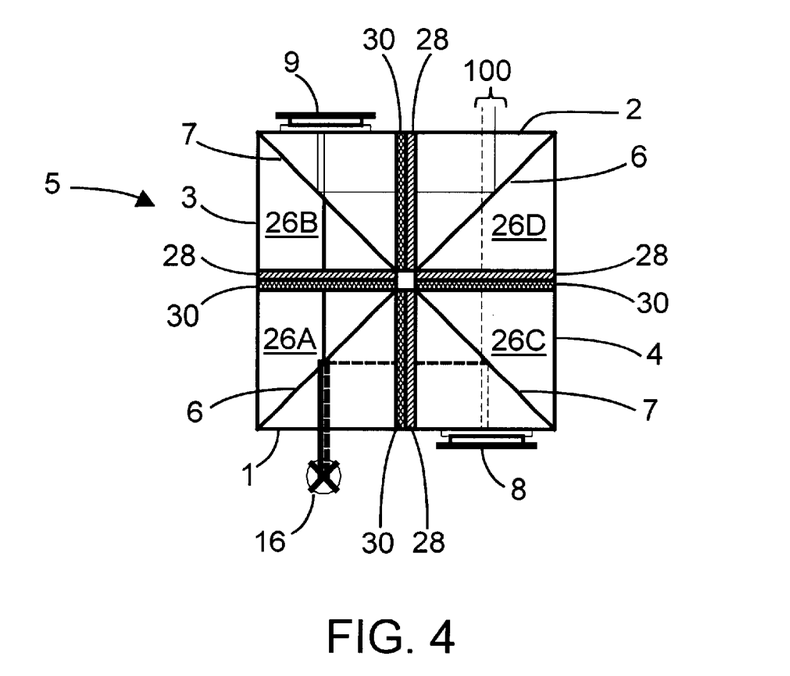
Figure 5:
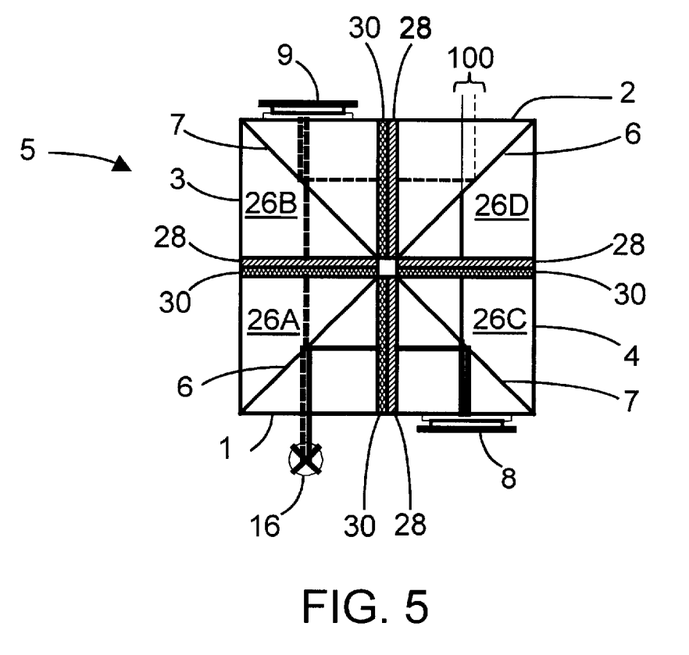

FIGS. 3–5 show a second exemplary embodiment of the invention. This embodiment is of the general type shown in the first embodiment with the following changes: (1) the embodiment employs polarization beam splitting cubes 26A, 26B, 26C, and 26D; (2) the embodiment employs sheet polarizers 30 between the adjoining faces of the beam splitting cubes; and (3) the embodiment employs half wave plates 28 between the adjoining faces of the beam splitting cubes.

FIGS. 3–5 show the light paths for P and S polarized light from the source of light 16 through polarization beam splitting prism 5 to the projection lens (not shown in these figures). In particular, FIG. 3 illustrates the propagation of light from the "on" pixels of the LCDs. As discussed above, when in the "on" state, the LCD changes the polarization of the reflected light. It is this reflected light that creates the image on the screen.

FIG. 4 shows the effect of polarization leaking through the illumination part of prism 5. When a small amount of wrong polarization passes through or reflects from the diagonals of the prism and reaches the LCDs, this light will be reflected from "off" pixels (no change in the polarization) and will reach the screen, where it will reduce the contrast of the system.

FIG. 5 shows the effect of polarization leaking through the imaging part of prism 5. In this case, illumination light reflects from "off" pixels of the LCDs. If some amount of this light leaks through or reflects from the diagonals of the prism, it will reach the screen and reduce the contrast.

Sheet polarizers 30 suppress this leaking illumination while still allowing imaging light to reach the screen as follows:

(1) The sheet polarizer between cubes A and B is oriented to transmit P and absorb S polarization. It will transmit the useful light (FIG. 3) and absorb unwanted light between cubes A and B (FIG. 4).

(2) The sheet polarizer between cubes C and D is oriented to transmit P and absorb S polarization. It will transmit the useful light (FIG. 3) and absorb unwanted light between cubes C and D (FIG. 5).

(3) The sheet polarizer between cubes A and C is oriented to transmit S and absorb P polarization. It will transmit the useful light (FIG. 3) and absorb unwanted light between cubes A and C (FIG. 4).

(4) The sheet polarizer between cubes B and D is oriented to transmit S and absorb P polarization. It will transmit the useful light (FIG. 3) and absorb unwanted light between cubes B and D (FIG. 5).

Half wave plates 28 work as compensators for skew ray polarization leakage. The compensation mechanism provided by these plates is of the general type described in U.S. Pat. No. 5,327,270, where a quarter wave plate, which works in a double path, is used. Half wave plates are used in prism 5 of FIGS. 3–5 since the light only passes once through the interfaces between cubes A, B, C, and D.

EXAMPLE 3

For the layouts of FIGS. 2 and 3, mechanical interference can occur between: (1) the projection lens and an LCD, which are located together on side 2 of prism 5; and/or (2) the illumination system and an LCD, which are located together on side 1 of prism 5.

Figure 6:
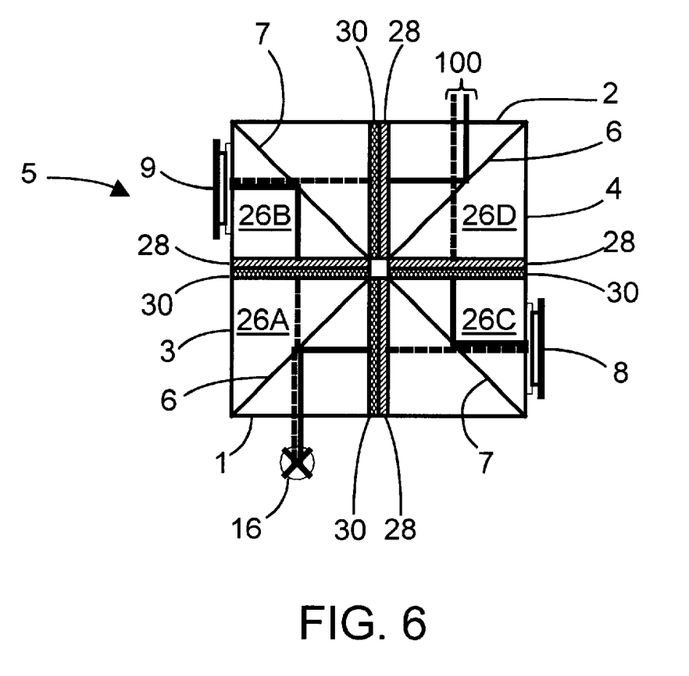
FIG. 6 illustrates an embodiment of the invention which achieves a high contrast ratio through the use of half wave plates oriented at 45° or 135°.

A third exemplary embodiment of the invention shown in FIG. 6 can be used to eliminate this interference without increasing the size of the prisms. As can be seen in this figure, LCDs 8 and 9 have been moved from the front and rear sides of the prism, where the projection and illumination systems are located, to the sides of the prism thus avoiding the problem of mechanical interference. As discussed below, the embodiment of this figure also achieves a high contrast ratio.

Figure 7:
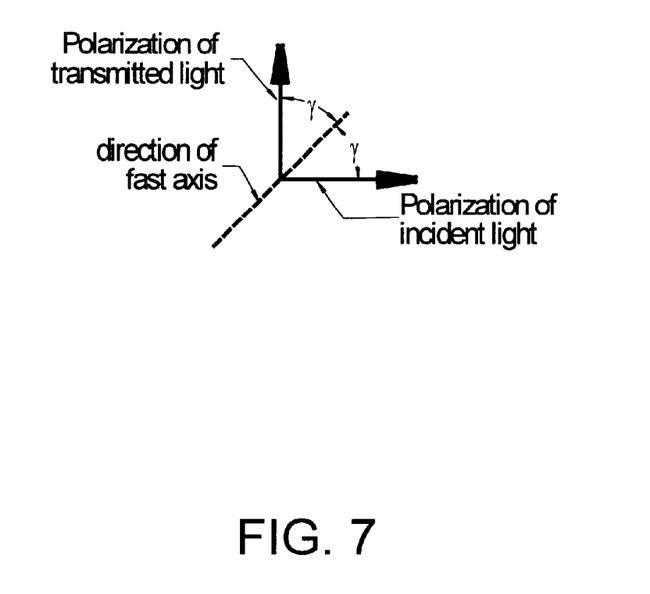
FIG. 7 illustrates the effect of a half-wave plate oriented at 45° or 135° where the dashed line shows the direction of the fast (or slow) axis of the plate, the horizontal axis shows the polarization of the incident light, and the vertical axis shows the polarization of the transmitted light.

As in the embodiment of FIG. 3, half wave plates 28 are used in the embodiment of FIG. 6. Rather than dealing with skew rays, however, these half wave plates have their fast and slow axes oriented to control polarization and thus enhance contrast. In particular, the half wave plates are oriented with either 45° or 135° between the fast or slow axis of the plate and the horizontal axis of FIG. 6. As shown in FIG. 7, this orientation causes each plate to rotate the plane of polarization of light passing through the plate by 90°.

In particular, light from the lamp 16 of FIG. 6 which passes through the first diagonal of the prism will be P-polarized and will have a horizontal orientation of its polarization plane. The angle γ between the direction of polarization and the direction of, for example, the fast axis for the half-wave plate is 45°.

As shown in FIG. 7, the half-wave plate will rotate the polarization direction through the angle 2γ. In this case, the polarization direction of light which passes through the half-wave plate will be oriented vertically, which corresponds to S polarization. By the same mechanism, S polarization which is incident on a half-wave plate is transformed to P polarization upon passing through a half-wave plate.

In this way, light having S polarization reflects from the diagonal of a prism once (and only once) on its way between the lamp and a LCD. Similarly, light having S polarization reflects from the diagonal of a prism once (and only once) on its way between a LCD and the projection lens. Conventional PBS cubes have a high extinction ratio for reflected S light, i.e., approximately 99.8% of the S light is reflected and only 0.2% passes through the diagonal. As a result, the configuration of FIG. 6 achieves a very high contrast ratio between on pixels and off pixels.

Figure 8:
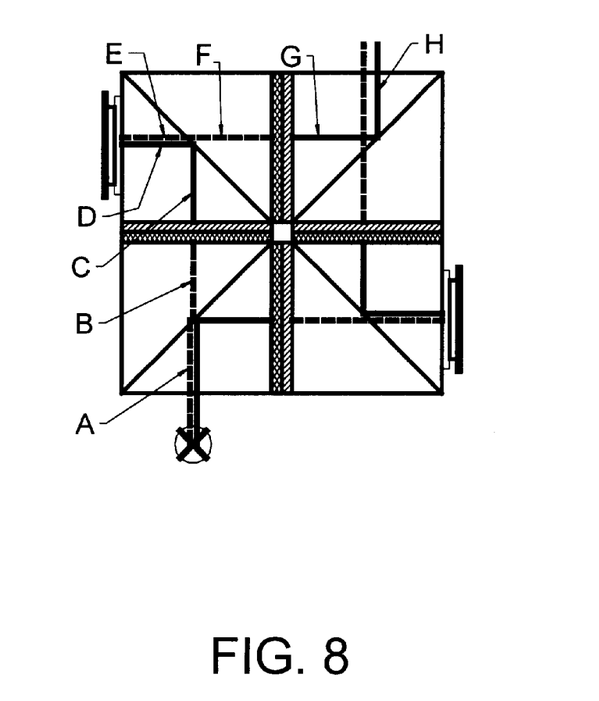
FIG. 8 in combination with Tables 1 and 2 illustrate the manner in which the layout of FIG. 6 achieves a high contrast ratio. For clarity, reference numbers are not shown in this figure, but would be the same as those of FIG. 6.

FIG. 8 and Tables 1 and 2 illustrate how this high contrast ratio is achieved. As shown therein, the estimated polarization efficiency (contrast) of the system of FIG. 6 is 1000:1. (Note that Table 2 calculates light intensities for only one channel, i.e., that associated with LCD 9. The calculations for LCD 8 are identical.) In practice, a contrast ratio of approximately 700:1 has been experimentally measured for a polarization beam splitter constructed in accordance with FIG. 6.

As in the embodiment of FIG. 3, sheet polarizers 30 can be used in the embodiment of FIG. 6 to increase the contrast of the system. The orientations of these sheet polarizers are selected to pass image light and block unwanted light. The particular orientation used will depend on whether the half wave plate is located before or after the sheet polarizer. The sheet polarizers can be omitted to increase the light transmission and reduce cost if the polarization coating of the diagonals of the prisms and/or the orientation of the half wave plates provides adequate contrast.

EXAMPLE 4

Figure 9:
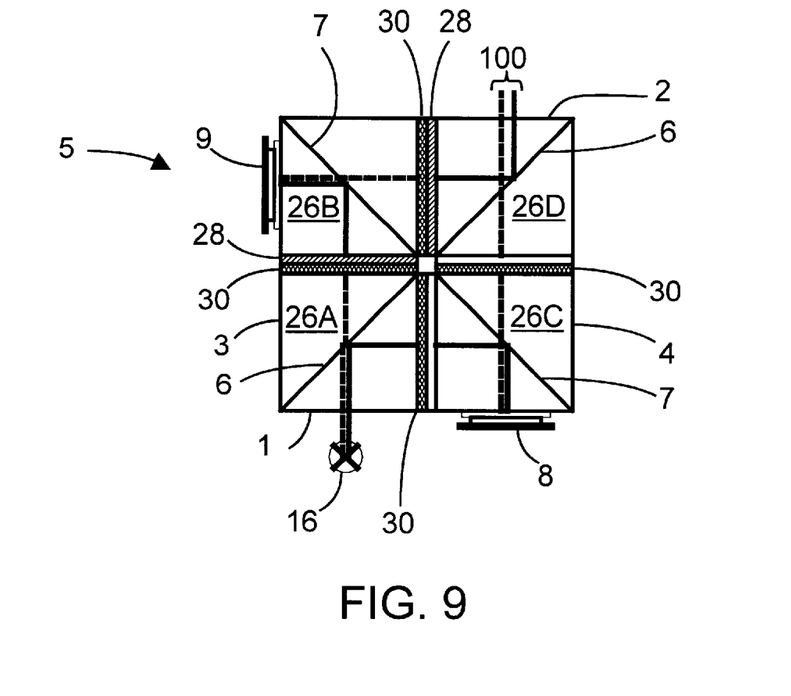
FIG. 9 shows a variation of the embodiment of FIG. 6 wherein half wave plates are used only at the interfaces between three, rather than all four, of the cubes making up the polarization beam splitter of the invention.

FIG. 9 illustrates a variation of the embodiment of FIG. 6 in which half wave plates are used only at the interfaces between three, rather than all four, of the cubes making up the polarization beam splitter of the invention. For this embodiment, only LCD 9 is moved from its position in FIG. 3. Typically, mechanical interference with a system's projection lens is more of a problem than mechanical interference with a system's light source. The layout of FIG. 9 can be used when this is the case and when a lower contrast level can be tolerated for a portion of the modulated light.

EXAMPLE 5

The preceding embodiments have been illustrated with two LCDs and thus can be used with a color wheel to create a color image.

Figure 10:
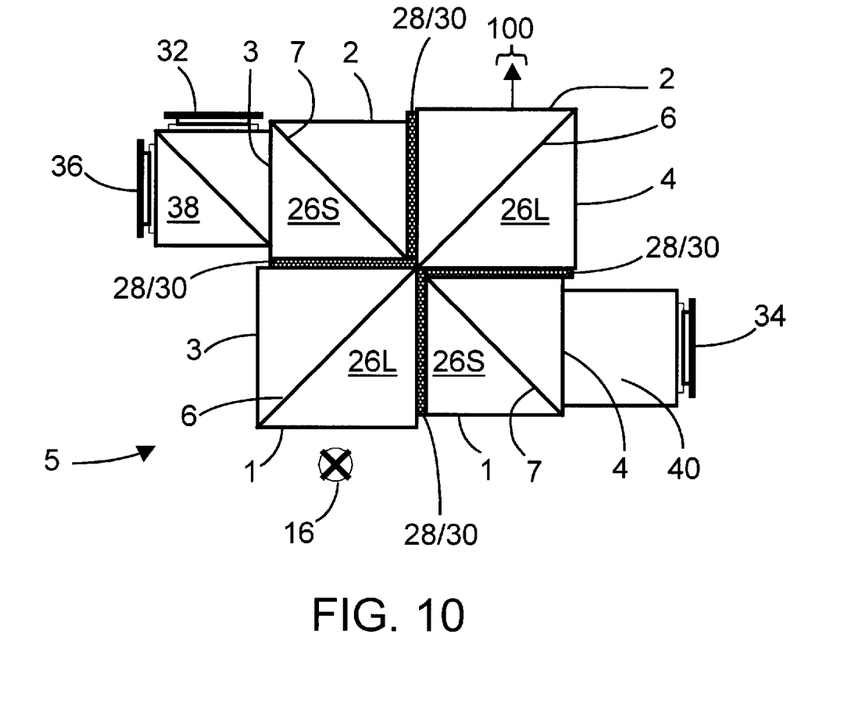
FIG. 10 illustrates an embodiment of the invention which employs three liquid crystal on silicon devices (i.e., three LCoS's).

The layout shown in FIG. 10 uses three LCDs (red, green, and blue), which can be cemented on the exit faces of the prisms, to reproduce a color image on the screen and does not require a color wheel. The LCDs are preferably of the liquid crystal on silicon (LCoS) type.

A color filter composed of thin film layers can be coated on the surfaces of the prisms in front of each LCD to provide color balance and color purity for the three channels. Also, a R/B filter can be placed at the interface between dichroic prism 38 and polarization beam splitter 5.

Figure 11:
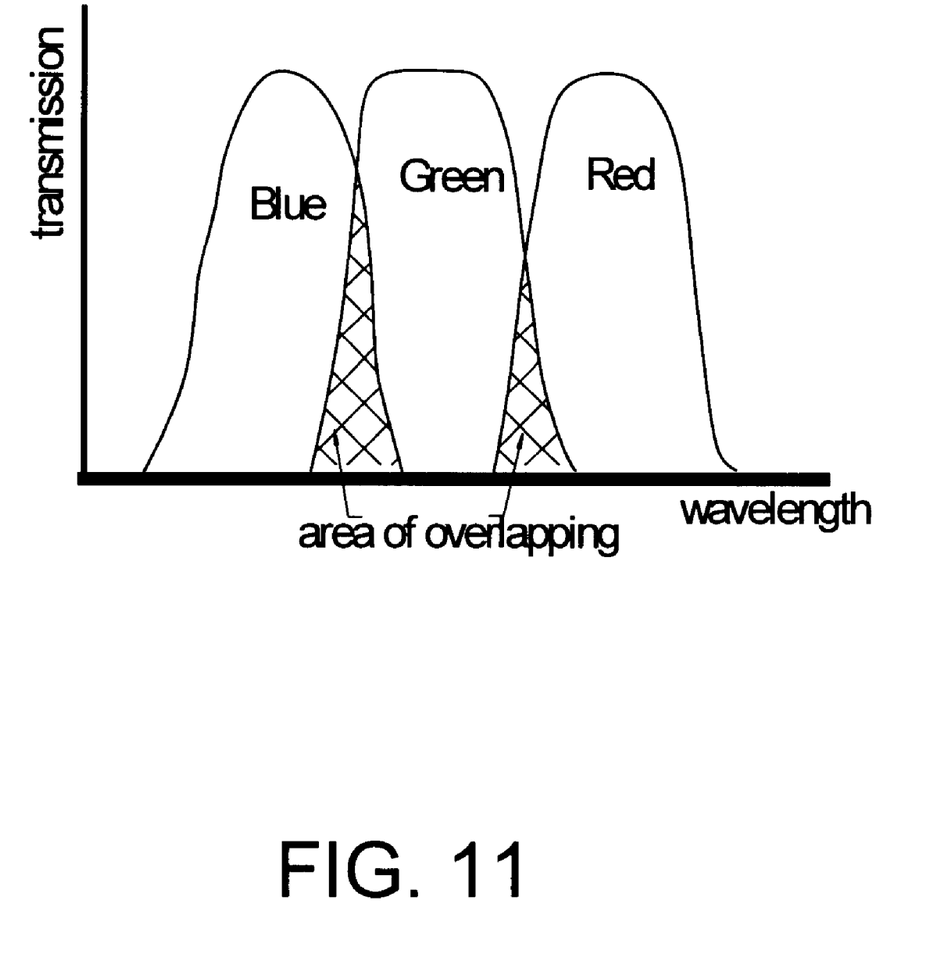
FIG. 11 illustrates color overlapping from different channels for the embodiment of FIG. 10.

The red and blue LCDs are preferably located in one polarization channel and the green LCD is in the other polarization channel. This arrangement allows one to increase the luminance efficiency of the system by overlapping of the spectrum used for the green channel with the spectrums used for the red and blue channels as shown in FIG. 11. With this layout, green light "knows nothing" about red and blue light and can be filtered to achieve desired color purity with low cost absorption or reflective filters. In addition, dichroic prism 38 used in the R/B channel can be of the low slope type, thus reducing its cost. As discussed above, a thin film filter can be used in front of each of the blue and red LCoS's to clean up any residual light of the wrong color which gets through the dichroic diagonal of dichroic prism 38.

A compensator 40 can be used to make the optical path length for green light substantially equal to the optical path lengths for red and blue light. Preferably, the compensator will include two filters, one on each side, one of which is a short pass filter and the other of which is long pass filter, so that their combination gives a green pass filter. Using two filters of this type is less expensive than using a single green pass filter.

If desired, the compensator can be replaced with a second dichroic prism and a fourth LCoS can be added to system. This fourth LCoS can be used, for example, to increase the amount of blue light which reaches the screen. See, for example, FIG. 2 of Japanese Patent Publication No. 10-253922, referred to above.

As shown in FIG. 10, the polarization beam splitting cubes can have different dimensions to reduce the optical path through the prism system. When this is done, the sides of polarization beam splitter 5 have a stepped, rather than a flat, configuration. Note that the splitter remains symmetric about diagonals 6 and 7.

Although specific embodiments of the invention have been described and illustrated, it is to be understood that modifications can be made without departing from the invention's spirit and scope. For example, although the use of a dichroic prism and compensator has been illustrated in FIG. 10 for the embodiment of the invention shown in FIG. 6, this approach for achieving a full color image can be used with any and all embodiments of the invention.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

Typical Values for the Polarization Properties of the Diagonal of a Polarization Beam Splitting Cube

| | |
|---|---|
| transmission for P polarization | 0.8 |
| transmission for S polarization | 0.002 |
| reflection for P polarization | 0.2 |
| reflection for S polarization | 0.998 |

TABLE 2

Light Intensity at the Lettered Location in Figure 8

| Light Location | LCD is "on" | | LCD is "off" | |
|---|---|---|---|---|
| | S | P | S | P |
| A After the source of light | 1 | 1 | 1 | 1 |
| B Transmitted through diagonal | 0.002 | 0.8 | 0.002 | 0.8 |
| C Transmitted through half wave plate | 0.8 | 0.002 | 0.8 | 0.002 |
| D Reflected from diagonal | 0.8 | 0.0004 | 0.8 | 0.0004 |
| E Reflected form LCD | 0.0004 | 0.8 | 0.8 | 0.0004 |
| F Transmitted through diagonal | 0.8E-6 | 0.64 | 0.0016 | 0.00032 |
| G Transmitted through half wave plate | 0.64 | 0.8E-6 | 0.00032 | 0.0016 |
| H Reflected from diagonal | 0.64 | 0.16E-6 | 0.00032 | 0.00032 |
| Total light from the prism | 0.64 | | 0.00064 | |

What is claimed is:

1. A method for improving the contrast of a projection system employing at least two reflective, polarization converting, pixelized panels comprising passing light from a light source to the two pixelized panels, modulating the light at the two pixelized panels, and passing the modulated light to a projection lens, wherein:

(a) between the light source and the projection lens, a first portion of the light passes through first and second half wave plates and a second portion of the light passes through third and fourth half wave plates, each half wave plate being oriented so as to transform S polarized light to P polarized light and P polarized light to S polarized light;

(b) between the light source and each of the two pixelized panels, the light interacts with two polarization diagonals, the light having S polarization for one of said interactions and having P polarization for the other of said interactions;

(c) between each of the two pixelized panels and the projection lens, the light interacts with two polarization diagonals, the light having S polarization for one of said interactions and having P polarization for the other of said interactions; and (d) all image-forming light that reaches the projection lens from the light source has:

(i) interacted with a polarization diagonal between the light source and a pixelized panel and, after said interaction, has had primarily P polarization; and (ii) interacted with a polarization diagonal between said pixelized panel and the projection lens and, after said interaction, has had primarily P polarization;

where for light having P polarization, an interaction with a polarization diagonal involves primarily transmission through the diagonal, and where for light having S polarization, an interaction with a polarization diagonal involves primarily reflection from the diagonal.

2. The method of claim 1 wherein the projection system employs only two reflective, polarization converting, pixelized panels.

3. The method of claim 1 wherein:
   (i) the projection system employs three reflective, polarization converting, pixelized panels;
   (ii) between the light source and each of the three pixelized panels, the light interacts with two polarization diagonals, the light having S polarization for one of said interactions and having P polarization for the other of said interactions; and
   (iii) between each of the three pixelized panels and the projection lens, the light interacts with two polarization diagonals, the light having S polarization for one of said interactions and having P polarization for the other of said interactions.

4. The method of claim 1 wherein:
   (i) the projection system employs four reflective, polarization converting, pixelized panels;
   (ii) between the light source and each of the four pixelized panels, the light interacts with two polarization diagonals, the light having S polarization for one of said interactions and having P polarization for the other of said interactions; and
   (iii) between each of the four pixelized panels and the projection lens, the light interacts with two polarization diagonals, the light having S polarization for one of said interactions and having P polarization for the other of said interactions.

5. The method of claim 1 wherein:
   (i) the first portion comprises red and blue light;
   (ii) the second portion comprises green light; and
   (iii) the second portion has a spectrum which overlaps a spectrum of the first portion.

6. A method for operating a projection system, said system comprising first and second reflective, polarization converting, pixelized panels, said method comprising passing light from a light source to the first and second pixelized panels, modulating the light at the first and second pixelized panels, and passing the modulated light to a projection lens, wherein:
   (a) between the light source and the first pixelized panel, light interacts with two polarization diagonals, the light having primarily S polarization after one of said interactions and having primarily P polarization after the other of said interactions;
   (b) between the first pixelized panel and the projection lens, light interacts with two polarization diagonals, the light having primarily S polarization after one of said interactions and having primarily P polarization after the other of said interactions;
   (c) between the light source and the second pixelized panel, light interacts with two polarization diagonals, the light having primarily S polarization after one of said interactions and having primarily P polarization after the other of said interactions;
   (d) between the second pixelized panel and the projection lens, light interacts with two polarization diagonals, the light having primarily S polarization after one of said interactions and having primarily P polarization after the other of said interactions; and
   (e) all image-forming light that reaches the projection lens from the light source has:
      (i) interacted with a polarization diagonal between the light source and a pixelized panel and, after said interaction, has had primarily P polarization; and
      (ii) interacted with a polarization diagonal between said pixelized panel and the projection lens and, after said interaction, has had primarily P polarization.

7. The method of claim 6 wherein the projection system comprises only two reflective, polarization converting, pixelized panels.

8. The method of claim 6 wherein:
   (i) the projection system further comprises a third reflective, polarization converting, pixelized panel;
   (ii) between the light source and the third pixelized panel, light interacts with two polarization diagonals, the light having primarily S polarization after one of said interactions and having primarily P polarization after the other of said interactions; and
   (iii) between the third pixelized panel and the projection lens, light interacts with two polarization diagonals, the light having primarily S polarization after one-of said interactions and having primarily P polarization after the other of said interactions.

9. The method of claim 8 wherein:
   (i) the projection system further comprises a fourth reflective, polarization converting, pixelized panel;
   (ii) between the light source and the fourth pixelized panel, light interacts with two polarization diagonals, the light having primarily S polarization after one of said interactions and having primarily P polarization after the other of said interactions; and
   (iii) between the fourth pixelized panel and the projection lens, light interacts with two polarization diagonals, the light having primarily S polarization after one of said interactions and having primarily P polarization after the other of said interactions.

10. A method for operating a projection system, said system comprising first and second reflective, polarization converting, pixelized panels, said method comprising passing light from a light source to the first and second pixelized panels, modulating the light at the first and second pixelized panels, and passing the modulated light to a projection lens, wherein:
   (a) between the light source and the first pixelized panel, light interacts with two polarization diagonals, the light having primarily P polarization after one of said interactions;
   (b) between the first pixelized panel and the projection lens, light interacts with two polarization diagonals, the light having primarily P polarization after one of said interactions;
   (c) between the light source and the second pixelized panel, light interacts with two polarization diagonals, the light having primarily P polarization after one of said interactions;
   (d) between the second pixelized panel and the projection lens, light interacts with two polarization diagonals, the light having primarily P polarization after one of said interactions; and
   (e) all image-forming light that reaches the projection lens from the light source has:
      (i) interacted with a polarization diagonal between the light source and a pixelized panel and, after said interaction, has had primarily P polarization; and
      (ii) interacted with a polarization diagonal between said pixelized panel and the projection lens and, after said interaction, has had primarily P polarization.

11. The method of claim 10 wherein the projection system comprises only two reflective, polarization converting, pixelized panels.

12. The method of claim 10 wherein:
(i) the projection system further comprises a third reflective, polarization converting, pixelized panel;
(ii) between the light source and the third pixelized panel, light interacts with two polarization diagonals, the light having primarily P polarization after one of said interactions; and
(iii) between the third pixelized panel and the projection lens, light interacts with two polarization diagonals, the light having primarily P polarization after one of said interactions.

13. The method of claim 12 wherein:
(i) the projection system further comprises a fourth reflective, polarization converting, pixelized panel;
(ii) between the light source and the fourth pixelized panel, the light interacts with two polarization diagonals, the light having primarily P polarization after one of said interactions; and
(iii) between the fourth pixelized panel and the projection lens, light interacts with two polarization diagonals, the light having primarily P polarization after one of said interactions.

14. A method for operating a projection system, said system comprising at least one reflective, polarization converting, pixelized panel, said method comprising passing light from a light source to the at least one pixelized panel, modulating the light at the at least one pixelized panel, and passing the modulated light to a projection lens, wherein all image-forming light that reaches the projection lens from the light source has:
(a) interacted with a polarization diagonal between the light source and a pixelized panel and, after said interaction, has had primarily P polarization; and
(b) interacted with a polarization diagonal between said pixelized panel and the projection lens and, after said interaction, has had primarily P polarization.

15. A method for improving the contrast of a projection system employing at least three reflective, polarization converting, pixelized panels comprising passing light from a light source to the three pixelized panels, modulating the light at the three pixelized panels, and passing the modulated light to a projection lens, wherein:
(a) between the light source and the projection lens, a first portion of the light passes through first and second half wave plates and a second portion of the light passes through third and fourth half wave plates, each half wave plate being oriented so as to transform S polarized light to P polarized light and P polarized light to S polarized light;
(b) between the light source and each of the three pixelized panels, the light interacts with two polarization diagonals, the light having S polarization for one of said interactions and having P polarization for the other of said interactions; and
(c) between each of the three pixelized panels and the projection lens, the light interacts with two polarization diagonals, the light having S polarization for one of said interactions and having P polarization for the other of said interactions;
where for light having P polarization, an interaction with a polarization diagonal involves primarily transmission through the diagonal, and
where for light having S polarization, an interaction with a polarization diagonal involves primarily reflection from the diagonal.

16. A method for operating a projection system, said system comprising at least a first, a second, and a third reflective, polarization converting, pixelized panel, said method comprising passing light from a light source to the first, second, and third pixelized panels, modulating the light at the first, second, and third pixelized panels, and passing the modulated light to a projection lens, wherein:
(a) between the light source and the first pixelized panel, light interacts with two polarization diagonals, the light having primarily S polarization after one of said interactions and having primarily P polarization after the other of said interactions;
(b) between the first pixelized panel and the projection lens, light interacts with two polarization diagonals, the light having primarily S polarization after one of said interactions and having primarily P polarization after the other of said interactions;
(c) between the light source and the second pixelized panel, light interacts with two polarization diagonals, the light having primarily S polarization after one of said interactions and having primarily P polarization after the other of said interactions;
(d) between the second pixelized panel and the projection lens, light interacts with two polarization diagonals, the light having primarily S polarization after one of said interactions and having primarily P polarization after the other of said interactions;
(e) between the light source and the third pixelized panel, light interacts with two polarization diagonals, the light having primarily S polarization after one of said interactions and having primarily P polarization after the other of said interactions; and
(f) between the third pixelized panel and the projection lens, light interacts with two polarization diagonals, the light having primarily S polarization after one of said interactions and having primarily P polarization after the other of said interactions.

17. A method for operating a projection system, said system comprising at least a first, a second, and a third reflective, polarization converting, pixelized panel, said method comprising passing light from a light source to the first, second, and third pixelized panels, modulating the light at the first, second, and third pixelized panels, and passing the modulated light to a projection lens, wherein:
(a) between the light source and the first pixelized panel, light interacts with two polarization diagonals, the light having primarily P polarization after one of said interactions;
(b) between the first pixelized panel and the projection lens, light interacts with two polarization diagonals, the light having primarily P polarization after one of said interactions;
(c) between the light source and the second pixelized panel, light interacts with two polarization diagonals, the light having primarily P polarization after one of said interactions;
(d) between the second pixelized panel and the projection lens, light interacts with two polarization diagonals, the light having primarily P polarization after one of said interactions;
(e) between the light source and the third pixelized panel, light interacts with two polarization diagonals, the light having primarily P polarization after one of said interactions; and
(f) between the third pixelized panel and the projection lens, light interacts with two polarization diagonals, the light having primarily P polarization after one of said interactions.

18. A method for improving the contrast of a projection system employing at least two reflective, polarization converting, pixelized panels comprising passing light from a light source to the two pixelized panels, modulating the light at the two pixelized panels, and passing the modulated light to a projection lens, wherein:
- (a) between the light source and the projection lens:
  - (i) a first portion of the light passes through first and second half wave plates which transform the polarization of said first portion, and
  - (ii) a second portion of the light passes through third and fourth half wave plates which transform the polarization of said second portion, each half wave plate being oriented so as to transform S polarized light to P polarized light and P polarized light to S polarized light;
- (b) between the light source and each of the two pixelized panels, the light interacts with two polarization diagonals, the light having S polarization for one of said interactions and having P polarization for the other of said interactions;
- (c) between each of the two pixelized panels and the projection lens, the light interacts with two polarization diagonals, the light having S polarization for one of said interactions and having P polarization for the other of said interactions;
- (d) the first portion comprises red and blue light;
- (e) the second portion comprises green light; and
- (f) the second portion has a spectrum which overlaps a spectrum of the first portion;

where for light having P polarization, an interaction with a polarization diagonal involves primarily transmission through the diagonal, and where for light having S polarization, an interaction with a polarization diagonal involves primarily reflection from the diagonal.

* * * * *